United States Patent [19]

Keel et al.

[11] Patent Number: 4,523,238
[45] Date of Patent: Jun. 11, 1985

[54] MAGNETIC HEAD PREAMPLIFIER/DRIVER

[75] Inventors: Beat G. Keel, Prior Lake; Robert W. Johnson, Bloomington, both of Minn.

[73] Assignee: Control Data Corporation, Minneapolis, Minn.

[21] Appl. No.: 466,400

[22] Filed: Feb. 15, 1983

[51] Int. Cl.³ .............................................. G11B 5/09
[52] U.S. Cl. ..................................................... 360/46
[58] Field of Search .................................... 360/46, 68

[56] References Cited

U.S. PATENT DOCUMENTS 4,249,219 2/1981 Aoi et al. .............................. 360/46

Primary Examiner—Vincent P. Canney
Attorney, Agent, or Firm—Edward L. Schwarz; Joseph A. Genovese

[57] ABSTRACT

This amplifier circuit for a magnetic transducer such as a magnetic head includes a pair of transistors which function both as write current modulators and read signal preamplifiers. The transistors are suitable for in situ deposition on a magnetic transducer carrier adjacent the winding, which keeps the signal lines of the data read by the transducer very short until amplification.

4 Claims, 1 Drawing Figure

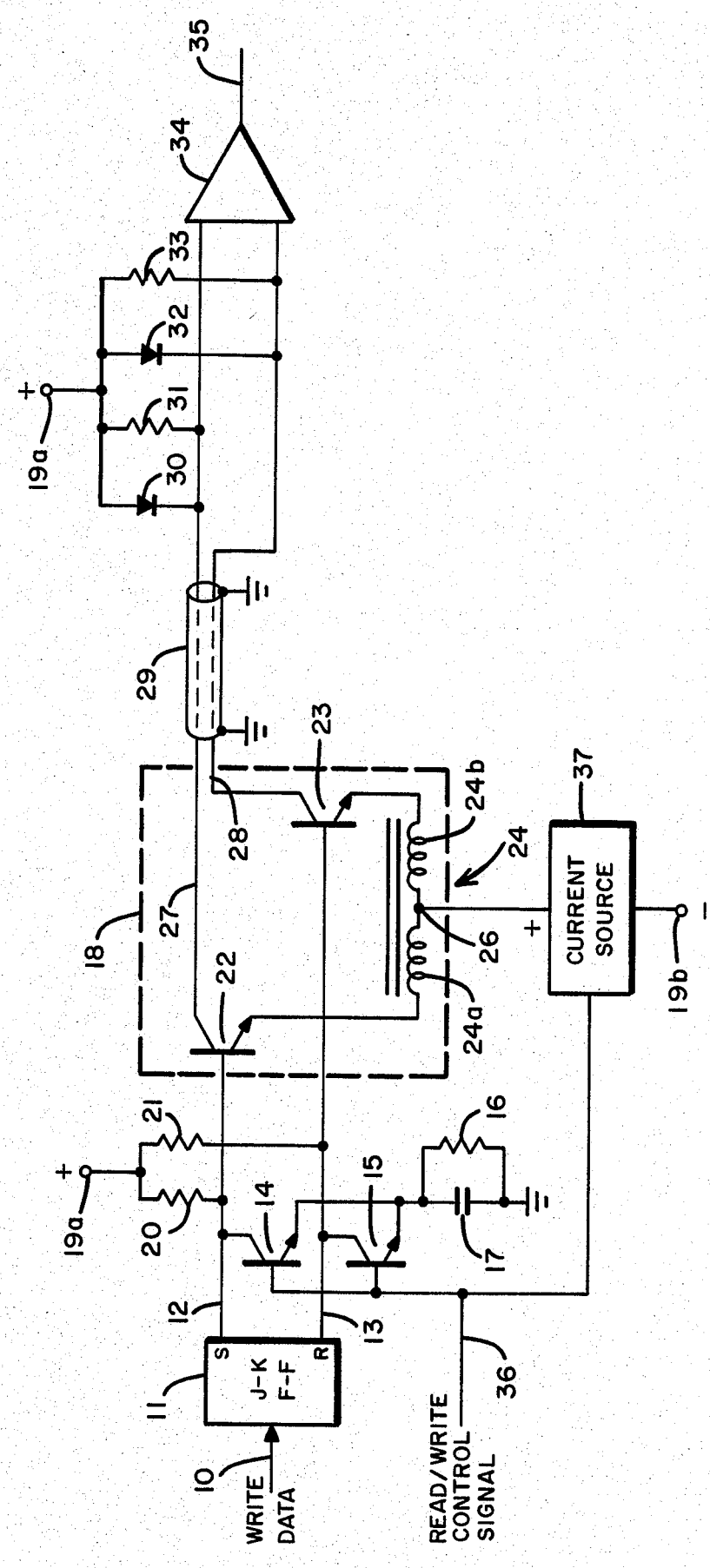

MAGNETIC HEAD PREAMPLIFIER/DRIVER

BACKGROUND OF THE INVENTION

Thin-film magnetic transducers have very low impedance because of the relatively few turns in their winding. Accordingly, heavy current flow is necessary for successful writing, and the signals produced by the winding during readback are relatively small and susceptible to crosstalk and noise. Hence, it is desirable to provide an amplifier which has very low input impedance and which is located as close to the transducer as possible to make the lead lines from the winding as short as possible. This is explained, for example, in *IBM Technical Disclosure Bulletin*, Vol. 22, No. 1, June, 1979, p. 331, "Magnetic Head Assembly Including Head Circuitry."

Among circuits which are suitable for location on a magnetic head carrier is that shown in *IBM Technical Disclosure Bulletin*, Vol. 16, No. 11, April, 1974, "Read/Write Switch with Remote Write Driver." This circuit has relatively complex, separate write driver circuitry and preamplifier circuitry. Accordingly, it requires a substantial amount of "real estate" on the carrier to accomplish the necessary functions. Another type of preamplifier circuit is shown in IBM TDB, Vol. 16, No. 5, October 1973. U.S. Pat. No. 4,085,383 discloses a diode selection circuit including a preamplifier suitable for low impedance heads.

BRIEF DESCRIPTION OF THE INVENTION

The instant invention employs a pair of transistors which function as both a write driver and read preamplifier for a magnetic transducer. The transducer is one which has a winding with a center tap which receives current from a current source. The current level is set to the relatively high level required for writing during write mode. The transistors receive at their bases during write mode the two halves of a bipolar write data signal and differentially control current flow through the two halves of the winding. The read mode is enabled by clamping the transistor bases to an AC ground and reducing the current applied to the center tap by the current source to a lower level for reading. The changing magnetic flux applied to the winding induces a voltage in it which is applied to the emitters of the two transistors operating as impedance transformers. Each winding half is terminated in a very low emitter input impedance while the higher impedance collectors provide the readback signal in their varying output voltages, in effect amplifying the winding signal voltages. Both read and write data lines, each being terminated by a pull-up impedance, provide the different impedances needed for reading and writing. The read signal voltages are available across the pull-up impedances of the read data lines.

The circuit has particular advantages when used with the thin film recording heads of disc memories. In particular, its output impedance as a driver and input impedance as a preamplifier is low, closely matching that of thin film heads. Because of its simplicity, it can easily be formed in situ on the substrate carrying the thin film head without appreciably affecting overall yield or consuming valuable area on the substrates.

Thus, another advantage of the invention is to make possible lead lines from a transducer winding to its preamplifier as short as possible. This prevents most noise from being induced during read mode on the signal lines until after the preamplification stage, which substantially reduces its effect on the signal content.

Another advantage arises from the ability to perform head selection by controlling current flow to the winding desired, remote from the head. This is important in disc memories where the head is mounted on a low mass, high compliance suspension remote from the electronic circuitry.

BRIEF DESCRIPTION OF THE DRAWINGS

The FIGURE is a circuit diagram of a preferred embodiment of the invention.

DESCRIPTION OF THE PREFERRED EMBODIMENTS

Turning to the FIGURE, a conventional write data signal is supplied to the circuit on signal path 10. This signal is changed to a bipolar write signal by a J-K flip-flop 11, which provides a logical 1 at its S terminal and a logical 0 at its R terminal when write data on path 10 is a logical 1, and a logical 0 at its S terminal and a logical 1 at its R terminal when the write data is a logical 0. It is convenient to assume that the voltage on path 12 indicating a logical 1 is more positive than that indicating a logical 0.

The bipolar write data signal is carried on write data lines 12 and 13, whose first ends are connected to the bases of drive transistors 22 and 23, respectively. Whichever transistor, 22 or 23, receives the logical 0 signal will have a lower collector to emitter impedance than will the transistor 22 or 23 receiving the more positive voltage representing a logical 1. Pull-up resistors 20 and 21 are connected respectively between the bases of drive transistors 22 and 23 by lines 12 and 13, and the positive terminal 19a of a power supply not shown. Additionally, clamp circuits comprising transistors 14 and 15 respectively, have their collectors connected to write data lines 12 and 13, with their emitters commonly connected to ground through a resistor 16 connected in parallel with a capacitor 17. An AC ground is thereby provided at the emitters of transistors 14 and 15. (Other types of AC grounds are also possible.) A read/write control signal on path 36 is applied to the bases of transistors 14 and 15, and has a level such that transistors 14 and 15 are saturated when the read/write control signal on path 36 is in its read state, and are cut off when the signal on path 36 is in its write state.

The emitters of drive transistors 22 and 23 are connected to the end taps of winding 24. The center tap 26 of winding 24 is connected to the positive terminal of current source 37, which supplies the current necessary for reading and writing operations. Since different current levels, high for writing and low for reading, are required, the read/write control signal carried on path 36 is also supplied to current source 37 to change its output to the high level when the state of the path 16 control signal indicates write mode, and low current output when the control signal on path 16 indicates read mode. The other terminal of current source 37 is connected to the negative terminal 19b of the power supply.

The collectors of drive transistors 22 and 23 are connected to first ends of read data signal paths 27 and 28 thereby supplying at their second ends a bipolar readback signal to a conventional differential amplifier 34 during read mode operation. It is convenient to provide a grounded shield 29 for these paths. Non-linear collector pull-up impedances terminate the second ends of paths 27 and 28, remote from the collectors of transistors 22 and 23. Although these non-linear impedances can have several different forms, the one preferred comprises a diode 30 and resistor 31 connected in parallel between the positive terminal 19a of the power supply and read data path 27. A similar non-linear collector pull-up impedance, comprising diode 32 and resistor 33, is connected between path 28 and terminal 19a of the power supply.

During operation in both write mode and read mode, transistors 22 and 23 together comprise as a differential amplifier. When one desires to perform a write operation, a read/write control signal on path 36 is set to its write mode state. This causes transistors 14 and 15 to be cut off and current source 35 to begin producing its high current output, typically several hundred milliamperes. Write data applied to path 10 causes the output of J-K flip-flop 11 to change as described earlier where a logical 1 level on path 12 is a higher voltage than a logical 0. Thus, a logical 1 on path 12 tends to shift transistor 22 into conduction, causing most of the current flow of current source 37 to flow from terminal 19a through resistor 31 and diode 30 and line 27 through from the collector of transistor 22 to its emitter. From transistor 22, the current flows through the half 24a of winding 24 to its center tap 26 and then through constant current source 37 to terminal 19b. At the same time, when the voltage on line 12 is relatively higher due to the presence of a logical 1, the voltage on line 13 is relatively lower due to the simultaneous presence of a logical 0 from the R terminal of flip-flop 11. This tends to shift transistor 23 toward cutoff so that relatively less current of current source 37 flows from diode 32 and resistor 33, through line 28, transistor 23, and winding half 24b to center tap 26. Accordingly, the net flux generated by winding 24 has a first polarity dictated by the greater current flow through winding half 24a, from its end tap toward center tap 26, than in the opposite direction through half 24b of winding 24 from its end tap toward center tap 26.

When the signal on write data path 10 changes state, the outputs of J-K flip-flop 11 change also, so that the signal on path 12 becomes a logical 0 with a lower voltage level and the signal on path 13 becomes a logical 1 with a relatively higher voltage. In this case, transistor 22 is driven toward cutoff and transistor 23 toward conduction of a greater percentage of the current flowing through current source 37. Thus, the relative level of current flow through winding halves 24a and 24b reverses, generating net magnetic flux of the opposite polarity because the flux generated by winding half 24b is different from and larger than that generated by half 24a. During writing, the large amount of current flow in source 37 causes voltage drops across resistors 31 and 33 great enough to forward bias diodes 30 and 32, so that the ends of read data lines 27 and 28 connected to amplifier 34 are only one diode drop below the potential of terminal 19a.

To place the circuit in read mode, the read mode state of the read/write control signal is applied to path 36 which causes transistors 14 and 15 to saturate and current source 37 to produce its laser, read mode amount of current. With transistors 14 and 15 saturated, paths 12 and 13 are commonly connected through a low impedance path to one terminal of capacitor 17 and the resistor 16 which shunts it, which essentially connects paths 12 and 13 and the bases of transistors 22 and 23 to each other and to AC ground. With the bases of transistors 22 and 23 at AC ground, the transistors 22 and 23 function as common base amplifiers, and voltage signals induced by a fluctuating external flux field applied to winding 24, and applied to the emitters of transistors 22 and 23 control the collector currents in transistors 22 and 23. When flux created during a readback operation induces a signal current in winding half 24a of a polarity which reduces the current through the emitter of transistor 22, then essentially the same current reduction can be seen in the current flow from terminal 19a through resistor 31 to the collector of transistor 22.

At the same time, the identical flux is acting on winding half 24b, causing a current change of the opposite polarity and amount to be induced therein, and the current through the emitter and collector of transistor 23 to be increased by that amount. Transistor 23 therefore conducts relatively more current from its collector to its emitter than flows from the collector to the emitter of transistor 22, and less current flows through resistor 31 than through resistor 33. This causes the voltage drop across resistor 31 to decrease and the voltage drop across resistor 33 to increase. Therefore, because of the unequal voltage drops across relatively large resistors 31 and 33, a relatively large differential voltage is applied to the inputs of amplifier 34, where path 27 is positive relative to path 28, and a read-back voltage signal of a first polarity is provided at the output of amplifier 34 on path 35. The values of resistors 31 and 33 should be chosen according to well-known principles so as to properly terminate the transmission line comprising signal paths 27 and 28 and shield 29.

When flux reverses, the flux change induce a current changes in the opposite directions in winding halves 24a and 24b. This causes the current through the collector and emitter of transistor 22 to be increased and of transistor 23 to be reduced. The situation is then reversed regarding the potential at the connections of resistors 31 and 33 to paths 27 and 28, and the amplifier 34 produces an output of a different polarity level on path 35. Thus, a varying flux imposed on winding 24 causes a corresponding variation in the signal output of amplifier 34 and on path 35, and the information contained within the flux variations imposed on winding 24 is converted to a varying electrical signal. The read mode current flows are so small through resistors 31 and 33 that diodes 30 and 32 don't conduct. Thus, the voltages at the imputs of amplifier 34 reflect the actual transistors 22 and 23 current flows and the flux sensed by the winding 24 at all times.

In the preferred usage of this circuit, the transducer of which winding 24 forms a part and transistors 22 and 23 (the elements in dotted line box 18) are all deposited on the same magnetic head substrate or carrier, according to well-known techniques. Such deposited transducers invariably have low impedance which nicely match the low input impedance of the common base configuration of transistors 22 and 23 in the read mode. In addition, the short signal paths between the end taps of winding 24 and the emitters of transistors 22 and 23 substantially reduce the noise and line loss associated with longer signal paths. During writing, the common collector or emitter follower configuration of transistors 22 and 23 has a low output impedance, again making the best possible match with winding 24.

Although the embodiment shown employs NPN types for drive transistors 22 and 23, it is easy to modify the circuit to operate with PNP types. The polarities of the power supply terminals 19a and 19b, the diodes 30 and 32 and the current source 37 must be reversed when transistors 22 and 23 are replaced with PNP types, collector for collector and emitter for emitter.

Corresponding changes obvious to those skilled in the art are also necessary in the output circuitry of flip-flop 11 and pull-down transistors 14 and 15.

What is claimed is:

1. A combination driver and preamplifier circuit for use with a magnetic transducer having a winding with a center tap and first and second end taps, said circuit powered by a current source having the first of its two terminals connected to the center tap and supplying read and write levels of current responsive respectively to the read and write states of a read/write control signal, and by a power supply having first and second terminals of polarity respectively matching the polarity of the first and second terminals of the current source, the second of its two terminals being connected to the second of the current source terminals, said circuit modulating the write current flow through the winding responsive to a bipolar write data signal, and preamplifying the read-back signal generated in the winding by a fluctuating magnetic field applied thereto, comprising:

(a) first and second transistors each having their emitters connected to the first and second end taps respectively;
   (b) a pair of pull-up resistors, each connected between one transistor base and the first power supply terminal;
   (c) a pair of write data lines, each connected at a first end to one transistor base and each receiving one half of the bipolar write data signal at the second end thereof;
   (d) a pair of clamp circuits, each connected between one write line and an AC ground point, and receiving the read/write control signal, and responsive to the read and write mode states respectively of the read/write control signal, clamping and unclamping the write data lines to AC ground;
   (e) a pair of read data lines, each connected at its first end to one transistor collector, and supplying at their second ends the preamplified read-back signal; and
   (f) a pair of non-linear collector pull-up impedances each connected between the second end of one read data line and the first power supply terminal.

2. The circuit of claim 1, wherein each pull-up impedance comprises a resistor and a diode in parallel, each said diode being conductive during the write state of the read/write control signal.

3. The circuit of claim 1, wherein the first terminals of both the current source and the power supply are more positive than the corresponding second terminals, and the transistors are both NPN types.

4. The circuit of claim 1, wherein the first terminals of both the current source and the power supply are more negative than the corresponding second terminals, and the transistors are both PNP types.

* * * * *